(12) United States Patent
Eliasson et al.

(10) Patent No.: US 6,284,105 B1
(45) Date of Patent: Sep. 4, 2001

(54) DIELECTRIC BARRIER DISCHARGE CRACKING

(75) Inventors: Baldur Eliasson, Birmenstorf (CH); Chang-Jun Liu, Tianjin (CN)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/583,742

(22) Filed: May 31, 2000

(30) Foreign Application Priority Data

Jun. 17, 1999 (EP) .................................................... 99810532

(51) Int. Cl.$^7$ ....................................................... B01J 19/08
(52) U.S. Cl. .......................... 204/165; 204/170; 204/172; 422/186.04
(58) Field of Search .................................. 204/165, 170, 204/172; 422/186.4

(56) References Cited

U.S. PATENT DOCUMENTS

| | | |
|---|---|---|
| 3,983,021 | 9/1976 | Henis . |
| 5,019,355 | 5/1991 | Sackinger . |
| 5,427,747 | 6/1995 | Kong et al. . |
| 5,626,726 | 5/1997 | Kong . |
| 6,159,432 | * 12/2000 | Mallison et al. ...................... 204/165 |

FOREIGN PATENT DOCUMENTS

WO95/03374    2/1995   (WO) .

OTHER PUBLICATIONS

"Nonequilibrium Volume Plasma Chemical Processing", Eliasson, et al., (Invited Review Paper), 5/89, pp. 1063–1077 (IEEE Log No. 9104413).

"Cracking of Hydrocarbons in a Plasma Reactor with High Concentration of Activated Hydrogen, etc.", Leuenberger, et al., (research article), pp. 595–600, No date available.

* cited by examiner

*Primary Examiner*—K. Mayekar
(74) *Attorney, Agent, or Firm*—Blank Rome Comisky & McCauley LLP

(57) ABSTRACT

A method of cracking a hydrocarbon composition having a normal boiling range beginning at a temperature of at least about 200° C., includes the steps of providing the hydrocarbon composition in a reactor including a first electrode mechanism, a second electrode mechanism and at least one layer of a normally solid dielectric material positioned between the first and the second electrode mechanisms. The hydrocarbon composition within the reactor is exposed to a dielectric barrier discharge, and the dielectric barrier discharge is controlled to convert the hydrocarbon composition into products having normal boiling points of below about 200° C.

21 Claims, 1 Drawing Sheet

DIELECTRIC BARRIER DISCHARGE CRACKING

This application claims priority under 35 U.S.C. §119 and/or 365 to Appln. No. 99 810 532.4 filed in Europe on Jun. 17, 1999 ; the entire content of which is hereby incorporated by reference.

BACKGROUND OF THE INVENTION

1. Field of the Invention

The present invention generally relates to the art of processing hydrocarbon compositions, and more particularly to a method for cracking hydrocarbon compositions.

2. Description of Related Art

The processing of hydrocarbon compositions to manufacture low molecular weight/lower boiling point organic products is commonly known as "cracking". Hydrocarbon cracking processes are widely used in many different technical fields, such as in the production of speciality organic chemicals and, with particular importance, in the petroleum processing industry.

An important product obtained from petroleum is gasoline, which is mainly used as motor fuel. Gasoline is a complex mixture including hundreds of different hydrocarbons containing 4 to 12 carbon atoms per molecule (the range may slightly vary depending on the source of definition). The different hydrocarbons have very different structures effecting the quality of fuel. It is known that the higher the degree of branching of the hydrocarbon chains, the higher the quality of the fuel and the less frequently the so-called "engine-knock phenomenon" occurs.

Since the amount of gasoline directly obtained by fractional distillation from refinery does not satisfy the need for its primary use as liquid fuel, thermal cracking, and later, catalytic cracking of crude oil, in particular heavy oil have been applied to increase the production of gasoline. Various methods of catalytic cracking are known of which FCC (Fluidized Catalytic Cracking) has become a very important operation for cracking of hydrocarbon compositions. Typical processes are using a fluidized bed of a particulate carrier/catalyst composition generally in the presence of hydrogen gas under pressure. Acid silicate catalysts including but not limited to silica-alumina-nickel as well as other comparable catalytic agents such as zeolites are commonly used as catalysts. The zeolite ZSM-5 has been recently found to be the best catalyst for FCC since this zeolite leads to most selective gasoline production thanks to its shape selectively. Light alkenes, in particular $C_3$ and $C_4$, and gas oil are the major secondary products with this catalyst.

A major problem with respect to the FCC process, however, is the coke information and carbon deposit on catalyst leading to a deactivation of the latter. Therefore, the catalyst has to be put into a regenerator to remove the carbon deposit and coke immediately after the FCC reaction causing a decrease of profitableness of the FCC processes.

More recently, plasmas have been found to be versatile tool for the development of new industrial processes and products. The properties of plasmas can be modified and a distinction is made between thermal and nonthermal plasmas differing markedly in both discharge characteristics and applications.

The energy distribution of the gas molecules, ions and electrons in thermal plasma indicates that the system is in thermal equilibrium and thus close to thermodynamic equilibrium. The temperature in the discharge region is uniformly very high for all particles. Moreover, there is a high energy flux in the plasma volume as well as at the electrodes if present. Thermal plasmas are therefore often called "hot plasmas". Hot plasmas include, in particular, arc discharges.

An essential condition for the formation of a thermal plasma is a sufficiently high working pressure usually being over 10 kPa. The resulting large number of collisions between particles, in particular between electrons and heavy positive ions or neutral particles, leads to rapid redistribution of energy so that equilibrium is reached.

Nonthermal plasmas, in contrast, are far from thermodynamic equilibrium. Nonthermal plasmas have comparatively low gas temperature and energy-conversion rates. Thus, the electrons in these plasmas have typically a very much higher temperature than the heavy ions and neutral particles. Nonthermal plasmas are therefore also named "cold plasmas". This group typically includes glow and silent discharges as well as radio-frequency and microwave discharges at pressures below 10 kPa. The feasibility of cold plasma has been confirmed by the industrial production of ozone. For brevity, reference is made to a report of Eliasson et al. in IEEE Transactions on Plasma Science, Vol. 19, page 1063–1077, the disclosure of which is incorporated herein for all purposes by way of reference.

The use of thermal plasma discharges for heavy hydrocarbon cracking, aromatics conversion and fuel upgrading pyrolysis has been reported. Thus, J. L. Leuenberger et al. has developed a thermal plasma hydrocracking process using an argon hydrogen plasma torch (report of J. L. Leuenberger, M. Mohammedi, E. Fraricke and J. Amouroux in Proc. of $12^{th}$ Int. Symp. on Plasma Chemistry, Minneapolis, USA, V.11, pp. 595–600, Aug. 21–25, 1995; this report being incorporated herein for all purposes by way of reference).

Moreover, U.S. Pat. No. 5,626,726 discloses a method using a thermal plasma for cracking a liquid hydrocarbon composition, such as crude oil, to produce a cracked hydrocarbon product. An electrical arc is generated directly within the liquid hydrocarbon composition so that the arc is entirely submerged in the composition. Arc generation is preferably accomplished using a primary and secondary electrode each having a first end submerged in the composition. The first ends of the electrodes are separated from each other to form a gap therebetween. An electrical potential is then applied to the electrodes to generate the arc within the gap. A reactive gas is thereafter delivered to the arc which forms a bubble around the arc. The arc and gas cooperate to produce a plasma which cracks the hydrocarbon composition.

Cracking of hydrocarbons via thermal plasma, however, is typically an intensive high temperature process and often requires, as in the abovementioned cases, an extra immediate quenching step to avoid production of carbon deposit and to get a sufficiently high quality of products. This induces a complex system. A lot of energy is thereby consumed that reduces the energy-efficiency. Moreover, the selectivity of products is not easy to control with thermal plasma processes so that further refining steps are often necessary for obtaining high quality products. Such quenching and/or refining steps lead to a significant increase in cost of manufacture.

In addition, safety regulations are often decisive whether a new developed process will be industrially applied. Hydrocarbon cracking processes operating via thermal plasmas generated by arc discharges cause the danger of spark flash-overs. Therefore, petroleum industry generally tend to avoid the incorporation of such processes within its pool of manufacturing methods.

Moreover, processing as well as apparatus requirements are not always easily met and there exists a continuous need for improved methods and apparatuses for cracking hydrocarbon compositions into lower molecular weight/lower boiling point products suitable for use as liquid fuels.

SUMMARY OF THE INVENTION

Accordingly, it is a primary object of the invention to meet these needs and to provide for a novel method of cracking a hydrocarbon composition.

It is a further object of the present invention to provide a safe and industrially applicable method of cracking a hydrocarbon composition. Particularly, it is an object of the present invention to provide a method of cracking a hydrocarbon composition which meets the safety regulations of the petroleum industry.

It is another object of the present invention to provide a method of cracking a hydrocarbon composition which can be carried out economically.

It is another object of the present invention to provide a method of cracking a hydrocarbon composition, which has a high selectivity for the formation of products being suitable as fuel.

It is another object of the present invention to provide a method of cracking a hydrocarbon composition, which has a high selectivity for the formation of better fuel, i.e. fuel containing a large amount of highly branched hydrocarbons. Accordingly, it is another object of the present invention to provide a method of cracking a hydrocarbon composition which obviates the need for a refining step and forms directly products suitable as fuels.

It is a further object of the present invention to provide a method of cracking a hydrocarbon composition that allows to obtain products containing oxygenates, preferably products being suitable as fuel. Accordingly, it is an object of the invention to provide a method in which the amount and type of the oxygenates contained in the products and fuels respectively are in accordance with valid regulations.

It is another object of the present invention to provide a method of cracking a hydrocarbon composition which is readily applicable to a wide variety of hydrocarbon materials.

Another object of the present invention is to provide an apparatus for cracking a hydrocarbon composition.

Further objects will become apparent below.

In accordance with a first general embodiment of the invention, a method is provided for cracking a hydrocarbon composition having a normal boiling range beginning at a temperature of at least about 200° C. In accordance with the method, the hydrocarbon composition is provided in a reactor. The reactor include a first electrode, a second electrode and one or more layers of a normally solid dielectric material positioned between the first and the second electrodes. The hydrocarbon composition within the reactor is exposed to a dielectric barrier discharge, and the dielectric barrier discharge is controlled to convert the hydrocarbon composition into products having normal boiling points that are below about 200° C.

In a second general embodiment of the invention, an apparatus is provided for cracking a hydrocarbon composition.

In a third general embodiment of the invention, a method is provided for cracking a hydrocarbon composition having a normal boiling range beginning at a temperature of at least about 200° C. The method includes the steps of providing the hydrocarbon composition in a reactor, wherein the reactor includes a first electrode, a second electrode and one or more layers of a normally solid dielectric material positioned between the first and the second electrodes. The hydrocarbon composition is generated by exposing a normally gaseous composition containing at least one hydrogen source, at least one oxygen source and at least one carbon source to a first dielectric barrier discharge that is controlled to convert the gaseous composition into a normally liquid fuel and a residue. The hydrocarbon composition is the residue. The hydrocarbon composition is then exposed within the reactor to a second dielectric barrier discharge, which is controlled to convert the hydrocarbon composition into products having normal boiling points of below about 200° C.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

Figure 1:
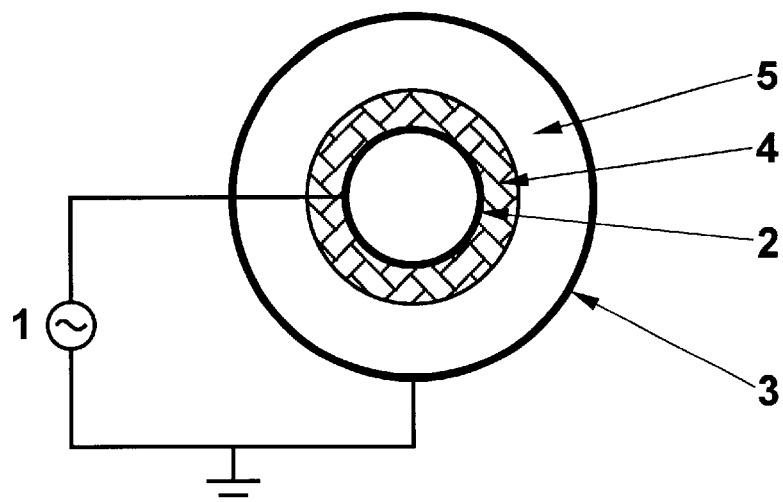
FIG. 1 is diagrammatic representation of a preferred dielectric barrier discharge reactor configuration according to the invention.

The term "hydrocarbon composition" as used herein shall refer to any type of composition containing at least 95% per weight carbon and hydrogen. Accordingly, a hydrocarbon composition according to the invention may comprise many different organic substances of nature or synthetic origin having different structures, such as aliphatic or aromatic compounds and, in particular, having different molecular compounds and, in particular, having different molecular weights or, what is commercially more important having different boiling points and ranges respectively. Therefore, a hydrocarbon composition according to the present invention may exist either in a liquid, fluid, semifluid or solid aggregation state or in a mixture of the aforementioned aggregation states. Accordingly, the present invention is not limited to the cracking of specific hydrocarbon compositions.

Typical examples of hydrocarbon compositions used in the present invention include residual substances upon fractionation or refining processes of petroleum and having a boiling range of above about 200° C. as well as waste products, by-products and residual substances respectively of synthetic processes, such as polymerizations. Further typical examples of hydrocarbon compositions will become apparent as this specification proceeds.

The term "about" as used herein before any numeral implies a variation of typically ±10%.

The term "normal" with regard to boiling points, boiling ranges, physical states of matter and the like indicates that the value is understood as being corrected for "normal conditions", i.e. ambient temperature of 25° C. and an atmospheric pressure of 1013 mbar.

The term "layer" is used herein to refer to any planar or curved stratum having a width dimension that is substantially larger than its thickness dimension; typically the width:thickness ratio is at least 10:1 and generally well above that value.

The term "residue" within the context of the inventive method refers to products formed, beside the normally liquid fuel, when a normally gaseous composition containing at least one hydrogen source, at least one oxygen source and at least one carbon source is exposed to a first dielectric barrier discharge according to the invention. Such residues contain at least 95% per weight carbon and hydrogen being in a semi-fluid or waxlike physical state of matter having a normal boiling range beginning at a temperature of at least about 200° C. In addition, there are some special plasma polymers generally formed on the dielectric during the discharge reactions. These plasma polymers, that are basically branched macromolecular materials, are very different from the regular polymer.

According to a preferred embodiment of the present invention the hydrocarbon composition has a normal boiling range beginning at a temperature of at least about 250° C., preferably beginning at a temperature of at least about 300° C. Typically, the hydrocarbon composition is passed through the reactor at a rate of from about 1 $m^3$/hour to about 120 $m^3$/hour.

According to another preferred embodiment the inventive method comprises the additional step of preheating the hydrocarbon composition to a temperature of at least about 100° C. The additional step of preheating improves the fluidity of the feed. Depending on the normal physical state of matter of the hydrocarbon composition feed the preheating allows thus to modify the physical state of matter of the hydrocarbon composition prior to the exposition to the dielectric barrier discharge. Exemplary, the preheating allows to change the aggregation state of the hydrocarbon composition, e.g. from liquid to gaseous, or to generate a hydrocarbon composition being in a two-phase state, e.g. a liquid-vapor state. A controlled preheating of the hydrocarbon composition allows thus to influence and to control the dielectric barrier discharge process.

The controlled conversion of the hydrocarbon composition according to the invention leads to products having normal boiling points of below about 200° C. Preferably, the products formed are suitable as motor fuels. By controlling the dielectric barrier discharge, and thus the generated non-equilibrium plasma, the formed products contain a high amount of highly branched hydrocarbons or iso-hydrocarbons since non-equilibrium plasmas can be controlled to perform isomerization of hydrocarbons. The increasing amount of highly branched and/or iso-hydrocarbons in the fuels improves engine performance since isomerization improves petrol quality by converting straight run alkanes into higher octane isomers, as already indicated. The conventional catalytic cracking of hydrocarbons can not produce sufficient amount of iso-hydrocarbons that are usually produced in other catalytic reactors. Therefore, additional manufacturing and refining steps respectively are required. Accordingly, the inventive cold plasma cracking of hydrocarbon compositions according to the invention advantageously produce highly branched hydrocarbons and iso-hydrocarbons respectively at the same time.

Moreover, as compared to prior art methods for cracking hydrocarbon compositions using thermal plasmas the inventive method does not require any quenching or refining steps and shows a much higher selectivity to the aforementioned objective products. Moreover, the method of cracking a hydrocarbon composition is generally operable at much lower temperatures as compared to prior art methods, even at room temperature.

In a further preferred embodiment the inventive method comprises the additional step of feeding at least one gaseous co-reactant into the reactor; the gaseous co-reactant is selected from the group of oxygen, carbon dioxide, air, water steam, hydrogen, helium, argon, carbon monoxide and light alkanes such as methane. Particularly, the use of hydrogen and/or a mixture of methane and hydrogen as gaseous co-reactants can lead to an increased yield of objective products.

As indicated above, non-equilibrium plasmas can be controlled to perform isomerization of hydrocarbons. The degree of isomerization and thus the selectivity towards branched hydrocarbons can even be further increased if the cracking of the hydrocarbon composition is effected in the presence of a gaseous co-reactant, preferably in the presence of gaseous hydrogen.

In another preferred embodiment of the present invention, oxygen species, such as carbon dioxide, water steam and/or oxygen, are fed as gaseous co-reactants into the reactor. The cold plasma cracking then partially produces some oxygenates while cracking the hydrocarbon composition. From an environmental point of view, fuels have been required to contain oxygenates, like methanol, ethylene glycol dimethyl ether (DME) and other higher alcohols. Oxygenates are very helpful to meet the regulations of clean air.

Preferably, the controlling of the dielectric barrier discharge is effected by an AC potential in the range of from about 6 kV to about 100 kV and a frequency of the AC potential in the range of about 60 Hz to about 1 MHZ.

In a further preferred embodiment of the present invention the controlling of the dielectric barrier discharge is effected by adjusting the discharge gap. Preferably the adjustment is effected by using dielectric tubes with different diameters.

Generally, the inventive method comprises the additional step of maintaining a pressure in the reactor in the range of from about 0.01 bar to about 10 bar, and the additional step of maintaining a temperature in the reactor in the range of from about 100° C. to about 400° C. The temperature is controlled, for example, by a heat-exchanger placed around the external surface of the dielectric barrier discharge reactor. Typically, the hydrocarbon composition is passed through said reactor at a rate of from about 1 $m^3$/hour to about 120 $m^3$/hour.

In a further preferred embodiment of the invention, the hydrocarbon composition is exposed to the dielectric barrier discharge in the presence of a catalyst selected from the group of zeolites, metal oxides, aluminophosphates, silicoaluminophosphates, metalloaluminophosphates and metal oxides containing OH groups. Preferably, the catalyst is dispersed in the hydrocarbon composition or is disposed on at least one of the at least one layer of the dielectric material.

The solid catalysts are generally used either in powder form or as normal solid particles or crystalline, amorphous or partially crystalline structure. However, it is obvious that various modifications, particularly regarding the applied form and size of the catalyst are apparent within the scope of the invention for those skilled in the art. Thus, a membrane catalyst is preferably used, wherein the membrane is formed on the top surface of the dielectric material or being just part of the at least one layer of the dielectric material.

In a further preferred embodiment of the invention the catalyst is a zeolite selected from the group of ZSM 5, zeolite X, zeolite Y, zeolite A and zeolite 13X. Zeolites, and in particular ZSM-5, shows an excellent shape- and shape-charge selectivity within the scope of the present invention.

The invention apparatus for cracking a hydrocarbon composition having a normal boiling range beginning at a temperature of at least about 200° C., includes a dielectric barrier discharge reactor including a first electrode, a second electrode and at least one layer of a normally solid dielectric material positioned between said first and said second electrodes. Moreover, the apparatus includes a mechanism for providing the hydrocarbon composition in the reactor, a mechanism for applying an AC potential in the range of from about 6 kV to about 100 kV and a frequency of the AC potential in the range of about 60 Hz to about 1 MHZ between the first and the second electrodes, and a mechanism for controlling the dielectric barrier discharge to convert the hydrocarbon composition into products having normal boiling points of below about 200° C. Preferably, the apparatus includes a mechanism for preheating the hydrocarbon composition to a temperature of at least about 100° C.

Typically, the apparatus comprises a mechanism for maintaining a pressure in the reactor in the range of from about 0.01 bar to about 10 bar as well as a mechanism for maintaining a temperature in the reactor in the range of from about 100° C. to about 400° C. The temperature and pressure within the reactor may have an impact on the energetics of the cold plasma formed. Therefore, controlling these parameters allows control over the energetic electrons of the cold plasma for an optimum operation of the cracking process.

In a further preferred embodiment of the present invention, the hydrocarbon composition has a normal boiling range beginning at a temperature of at least about 250° C., preferably beginning at a temperature of at least about 300° C. Typically, the apparatus includes a mechanism for adjusting the discharge gap.

In another preferred embodiment of the present invention, the apparatus comprises a mechanism for feeding at least one gaseous co-reactant into the reactor. The gaseous co-reactant is selected from the group of oxygen, carbon dioxide, air, water steam, hydrogen, helium, argon, carbon monoxide and light alkanes.

In a further preferred embodiment of the inventive apparatus a plurality of pairs of the first and the second electrodes are arranged in an essentially parallel or stacked configuration forming a plurality of gaps. The gaps are connected in series to form an elongated path for passage of the hydrocarbon composition.

In a preferred embodiment of the inventive method the gaseous composition consists at least in part of carbon dioxide as said carbon source and said oxygen source, and of methane as said hydrogen source and as a second carbon source. Typically, the carbon dioxide and the methane are contained in the gaseous composition at a molar ratio of carbon dioxide:methane of between about 1:1 to about 1:4, preferably between about 1:2 to about 1:3.

In a further embodiment of the inventive method, the normally gaseous composition is exposed to the first dielectric barrier discharge in the presence of a normally solid catalyst. The normally solid catalyst is a member selected from the group of zeolites, aluminophosphates, silicoaluminophosphates, metalloaluminophosphates and metal oxides containing OH groups. Preferably, the zeolite is a member selected from the group of zeolite X, zeolite Y, zeolite A, zeolite ZSM-5 and zeolite 13X.

The residue formed in the course of the first dielectric barrier discharge is typically disposed on the dielectric, generally in a waxlike state. The discharge gap of the second dielectric barrier discharge applied is then determined by the amount of wax, i.e. long-chain hydrocarbons, if the same reactor and dielectrics are used for both discharges. However, the discharge gap can also be adjusted, e.g. by using dielectric tubes with different diameters or varying the geometric structure of the dielectric barrier discharge reactor.

The inventive method of cracking such residues allows to operate dielectric barrier discharge reactors in a very economic and efficient manner since essentially no regenerating or cleaning of the reactors, dielectrics and the like is necessary. On the contrary, the inventive method of cracking a hydrocarbon composition, such as the mentioned residue may serve as a process for regenerating the dielectric and the like and/or cleaning the dielectric barrier discharge reactor and the like while forming very valuable products. By controlling the second dielectric barrier discharge products having normal boiling points of below about 200° C. are obtained. Typically, the products of such a cracking are light hydrocarbons ($C_2$–$C_4$).

FIG. 1 shows schematically a preferred representation of a di-electric barrier discharge reactor according to the invention. The high voltage AC generator 1 is connected to the first electrode 2 and to the second grounded electrode 3 both having an essentially cylindrical form. Electrode 3 forms an outer shell and the first electrode 2 forms an inner shell. The dielectric layer 4 covers the effective surface of electrode 2. The dielectric layers have typically a thickness being from about 1 mm to about 10 mm. The hydrocarbon composition passes through the cylindrical discharge gap 5, where it is exposed to the dielectric barrier discharge. By adjusting the size and dimension of the discharge gap 5, preferably by adjusting its width and/or length it is possible to control the energetic electrons of the cold plasma for the optimum operation of the cracking. Typical widths of discharge gaps are of 1–3 mm and typical lengths of discharge gaps are in the range of 1 to 2 m. In the case a catalyst is used for the present invention the size and dimension of the discharge gap 5 is furthermore adjustable by either the type of catalyst applied and the way the catalyst is arranged within the discharge gap as indicated below. Another preferred embodiment, even if not explicitly shown in a figure, is similar to the one shown in FIG. 1, wherein the first and the second electrode means as well as the layer of the dielectric material are of tubular form.

Further parameters to control the dielectric barrier discharge are, inter alia, the temperature and pressure within the reactor, the applied and effective AC voltage and its frequency, the choice of catalysts and/or gaseous co-reactants as well as the temperature at which the hydrocarbon composition is preheated.

One of the main reasons we have chosen dielectric barrier discharge reactors for cracking hydrocarbon compositions according to the invention is its use in commercial generators for industrial ozone manufacture. The principal advantages of dielectric barrier discharges are: it combines the large volume excitation of glow discharges with the high pressure characteristics of corona discharges; the entire electrode area is effective for discharge reactions. A further advantage of the plasma cracking processing according to the invention is the insensitivity—in the presence as well as in the absence of a catalyst—toward sulfur and/or heavy metal elements contained in hydrocarbon compositions such as petroleum.

The dielectric barrier discharge is a high pressure non-equilibrium discharge which occurs when alternating voltages are applied between two electrodes separated by a non-conducting medium. As indicated above, the frequency of the AC electric field can vary over a wide range from line frequency to several MHZ. Glass, ceramics, $ZrO_2$, quartz or $Al_2O_3$ can be used as dielectric materials. It has been observed, moreover, that some of these dielectrics, in particular quartz or $Al_2O_3$, show catalytic activity for hydrocarbon formation. Thus, XPS characterization has shown that the quartz surface is catalytically active for the formation of hydrocarbons under the influence of gas discharges.

When the amplitude of the applied AC electric field reaches a critical value, breakdown is initiated in the gas and a current flows from one electrode to the other. Once the breakdown is initiated at any location within the discharge gap, charge accumulates on the dielectric to form an opposite electric field. This opposite electric field reduces the external electric field within the discharge gap and interrupts the current flow in a few nanoseconds to form microdischarges. The duration of the current pulse relates to pressure and properties of gases involved and the dielectrics applied. A large number of such microdischarges will be generated when a sufficiently high AC voltage is applied.

Figure 2:
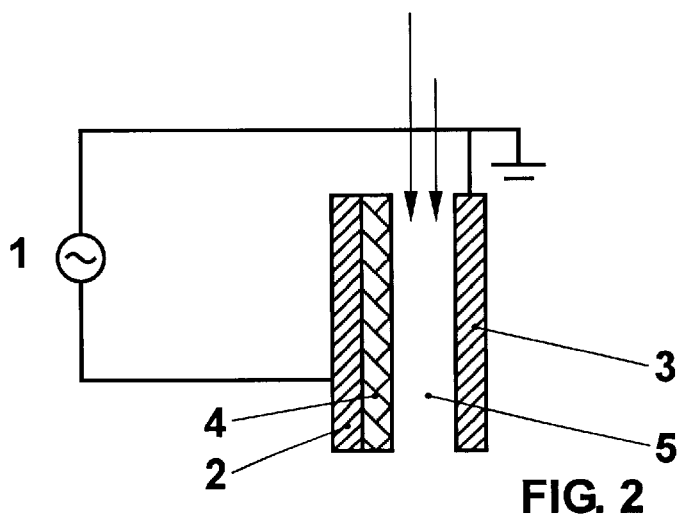
FIG. 2 is a diagrammatic representation of a further preferred dielectric barrier discharge reactor configuration according to the invention.

FIG. 2 shows another preferred configuration of a dielectric barrier discharge reactor according to the invention. The corresponding electrodes 2 and 3 and the dielectric 4 of this embodiment have an essentially planar form. The first electrode 2 is distanced from the second electrode means 3 by the essentially planar discharge gap 5 for passing the hydrocarbon composition, in the direction of the arrows shown, through gap 5 and for exposing it to a dielectric barrier discharge therein.

Figure 3:
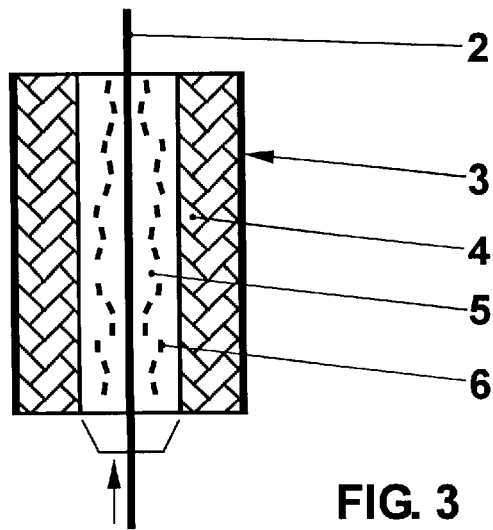
FIG. 3 is a diagrammatic representation of a preferred dielectric barrier discharge reactor configuration according to the invention.

Typically the cracking of the hydrocarbon composition is effected in the presence of a catalyst. To this purpose the catalyst is preferably dispersed in the hydrocarbon composition. Such a preferred dielectric barrier discharge configuration is schematically shown in FIG. 3. Thus, catalyst 6 is dispersed in the hydrocarbon composition passing through the reactor in the direction of the arrow shown. The means used to continuously feed the hydrocarbon composition and to recycle the catalyst are known for the man skilled in the art and are not further described in detail. In another preferred embodiment of the inventive apparatus not shown in the figures, the catalyst is disposed on the dielectric layer. Typically, the dielectric layer is a dielectric tube which serves as support for the catalyst. So, the catalyst typically in powder form, is disposed in a piece of gas-permeable quartz fleece and wrapped around the outer surface of the dielectric tube.

Typically, the catalyst is selected from the group of zeolites, metal oxides, aluminophosphates, silicoaluminophosphates, metalloaluminophosphates and metal oxides containing OH groups, preferably, it is a zeolite selected form the group of ZSM 5, zeolite X, zeolite Y, zeolite A and zeolite 13X.

In a first example, a gaseous composition containing 50% methane and 50% carbon dioxide were introduced into the system flowing downstream through the reactor. The flow rate was 200 ml/min. The catalyst used was 13X zeolite. An alternating voltage of about 10 kV with a frequency of about 30 Hz was applied to the electrodes. A dielectric barrier discharge was thus initiated. The operating pressure was about 1 bar and the operating temperature was maintained at about 200° C. for about 10 hours. Then, the feed of the gaseous composition was stopped and a second dielectric barrier discharge was initiated to crack the residue formed. The residue contained mainly heavy oil, i.e. hydrocarbons containing at least 12 carbon atoms, and polymers, mainly as a mixture of branched macromolecule materials having a melting range around 400° C. The residue was mostly disposed on the dielectric. The second dielectric barrier discharge was initiated by applying an alternating voltage of about 10 kV with a frequency of 32 kHz to the electrodes. The operating temperature was maintained at about 150° C. and the operating pressure was about 1 bar. A gaseous co-reactant hydrogen was passed through the reactor with a flow rate of about 200 ml/min. The product obtained was mostly light hydrocarbons containing 2 to 4 carbon atoms ($C_2$–$C_4$).

Although certain preferred embodiments of the invention have been described herein, it will be apparent to those skilled in the art to which the invention pertains that modifications and variations of the described embodiments may be made without departing from the spirit and scope of the invention.

What is claimed is:

1. A method of cracking a hydrocarbon composition having a normal boiling range beginning at a temperature of at least about 200° C. comprising the steps of:

providing said hydrocarbon composition in a reactor including a first electrode means, a second electrode means and at least one layer of a normally solid dielectric material positioned between said first and said second electrode means;

exposing said hydrocarbon composition within said reactor to a dielectric barrier discharge; and controlling said dielectric barrier discharge to convert said hydrocarbon composition into products having normal boiling points of below about 200° C.

2. The method of claim 1 comprising the additional step of preheating said hydrocarbon composition to a temperature of at least about 100° C.

3. The method of claim 1 comprising the additional step of feeding at least one gaseous co-reactant into said reactor, wherein said gaseous co-reactant is selected from the group consisting of oxygen, carbon dioxide, air, water steam, hydrogen, helium, argon, carbon monoxide and light alkanes.

4. The method of claim 1 wherein said hydrocarbon composition is exposed to said dielectric barrier discharge in the presence of a catalyst selected from the group consisting of zeolites, metal oxides, aluminophosphates, silicoaluminophosphates, metalloaluminophosphates and metal oxides containing OH groups.

5. The method of claim 4 wherein said catalyst is dispersed in said hydrocarbon composition.

6. The method of claim 4 wherein said catalyst is disposed on at least one of said at least one layer of said dielectric material.

7. The method of claim 4 wherein said zeolite is selected from the group consisting of ZSM5, zeolite X, zeolite Y, zeolite A and zeolite 13X.

8. The method of claim 1 wherein said hydrocarbon composition has a normal boiling range beginning at a temperature of at least about 250° C.

9. The method of claim 8 wherein said hydrocarbon composition has a normal boiling range beginning at a temperature of at least about 300° C.

10. An apparatus for cracking a hydrocarbon composition having a normal boiling range beginning at a temperature of at least about 200° C., the apparatus comprising:

a dielectric barrier discharge reactor including a first electrode means, a second electrode and at least one layer of a normally solid dielectric material positioned between said first and said second electrode means;

means for providing said hydrocarbon composition in said reactor;

means for generating a dielectric barrier discharge; and means for controlling said dielectric barrier discharge to convert said hydrocarbon composition into products having normal boiling points of below about 200° C.

11. The apparatus of claim 10 wherein said apparatus comprises means for feeding at least one gaseous co-reactant into said reactor, wherein the at least one gaseous co-reactant is selected from the group consisting of oxygen, carbon dioxide, air, water steam, hydrogen, helium, argon, carbon monoxide and light alkanes.

12. The apparatus of claim 10 further comprising a catalyst arranged for contact with said hydrocarbon composition, said catalyst being selected from the group consisting of zeolites, metal oxides, aluminophosphates, silicoaluminophosphates, metalloaluminophosphates and metal oxides containing OH groups.

13. The apparatus of claim 12 wherein said catalyst is selected from the group of zeolites consisting of ZSM 5, zeolite X, zeolite Y, zeolite A and zeolite 13X.

14. The apparatus of claim 10, further including means for applying an AC potential between said first and said second electrode means.

15. A method of cracking a hydrocarbon composition having a normal boiling range beginning at a temperature of at least about 200° C., the method comprising the steps of:

providing said hydrocarbon composition in a reactor including a first electrode means, a second electrode means and at least one layer of a normally solid dielectric material positioned between said first and said second electrode means, wherein said hydrocarbon composition is a residue generated by exposing a normally gaseous composition containing at least one hydrogen source, at least one oxygen source and at least one carbon source to a first dielectric barrier discharge controlled for converting said gaseous composition into a normally liquid fuel and said residue;

exposing said hydrocarbon composition within said reactor to a second dielectric barrier discharge for cracking said hydrocarbon composition; and controlling said second dielectric barrier discharge to convert said hydrocarbon composition into products having normal boiling points of below about 200° C.

16. The method of claim 15 wherein said gaseous composition comprises carbon dioxide as said carbon source and said oxygen source, and comprises methane as said hydrogen source and as a second carbon source.

17. The method of claim 16 wherein said carbon dioxide and said methane are contained in said gaseous composition at a molar ratio of carbon dioxide:methane of between about 1:1 to about 1:4.

18. The method of claim 17 wherein said carbon dioxide and said methane are contained in said gaseous composition at a molar ratio of carbon dioxide:methane of between about 1:2 to about 1:3.

19. The method of claim 15 further comprising the step of exposing said normally gaseous composition said first dielectric barrier discharge in the presence of a normally solid catalyst, wherein said normally solid catalyst is a member selected from the group consisting of zeolites, aluminophosphates, silicoaluminophosphates, metalloaluminophosphates and metal oxides containing OH groups.

20. The method of claim 19 wherein said zeolite is selected from the group zeolite X, zeolite Y, zeolite A, zeolite ZSM-5 and zeolite 13X.

21. The method of claim 15, further comprising the step of generating the hydrocarbon composition by exposing a normally gaseous composition containing at least one hydrogen source, at least one oxygen source and at least one carbon source to a first dielectric barrier discharge controlled for converting said gaseous composition into a normally liquid fuel and a residue, wherein the hydrocarbon composition is the residue.

* * * * *